(12) United States Patent
Kenmochi et al.

(10) Patent No.: US 6,329,308 B1
(45) Date of Patent: Dec. 11, 2001

(54) DISPOSABLE WIPE-OFF ARTICLE

(75) Inventors: Yasuhiko Kenmochi; Hiroki Ishikawa, both of Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 555 days.

(21) Appl. No.: 08/746,953

(22) Filed: Nov. 18, 1996

(30) Foreign Application Priority Data

Nov. 17, 1995 (JP) ................................................ 7-300249

(51) Int. Cl.[7] ........................................................ B32B 27/12
(52) U.S. Cl. .................... 442/394; 442/382; 442/392; 442/401
(58) Field of Search ........................... 442/394, 401, 442/382, 392

(56) References Cited

U.S. PATENT DOCUMENTS

| | | | | |
|---|---|---|---|---|
| 3,505,155 | * | 4/1970 | Balch et al. ............................ | 161/57 |
| 4,041,203 | * | 8/1977 | Brock et al. .......................... | 428/157 |
| 4,196,245 | * | 4/1980 | Kitson et al. ......................... | 428/198 |
| 4,436,780 | * | 3/1984 | Hotchkiss et al. .................... | 428/198 |
| 4,991,362 | * | 2/1991 | Heyer et al. .......................... | 51/400 |
| 5,229,191 | * | 7/1993 | Austin ................................... | 428/198 |
| 5,368,913 | | 11/1994 | Ortega . | |

FOREIGN PATENT DOCUMENTS

| | | |
|---|---|---|
| 0 262 817 | 4/1988 | (EP) . |
| 0 289 198 | 11/1988 | (EP) . |
| 0596 532 A1 | 5/1994 | (EP) . |
| 5-245090 | 9/1993 | (JP) . |

\* cited by examiner

*Primary Examiner*—Terrel Morris
*Assistant Examiner*—Arti R. Sinah
(74) *Attorney, Agent, or Firm*—Lowe Hauptman Gilman & Berner, LLP

(57) ABSTRACT

A disposable wipe-off article having improved durability. The disposable wipe-off article includes a heat-sealable sheet and a heat-sealable wipe-off layer including an expanded bundle of continuous filaments. The wipe-off layer is bonded to the base sheet by a plurality of heat-seal lines extending to cross the continuous filaments and intermittently arranged longitudinally of the continuous filaments.

6 Claims, 3 Drawing Sheets

DISPOSABLE WIPE-OFF ARTICLE

BACKGROUND OF THE INVENTION

The present invention relates generally to a disposable wipe-off article and more particularly an article used to clean a house floor or the like.

A wipe-off article for cleaning a floor is well known, for example, in Japanese Laid-Open Patent Application No. Hei5-245090 according to which a base sheet is covered with a wipe-off cloth of nonwoven fibrous fabric with the latter intermittently bonded to the former. The wipe-off cloth is immersed with surfactant so that the floor can be reliably wiped off.

However, the known wipe-off article is disadvantageous in that fibers forming the article serving to wipe the floor may be torn off when they are caught by small projections present on the floor. This readily occurs particularly when short fibers are used in the wipe-off article.

SUMMARY OF THE INVENTION

It is a principal object of the invention to improve a disposable wipe-off article so as to prevent fibers forming the article from being readily torn off.

The object set forth above is achieved, according to the invention, by providing a disposable wipe-off article including a heat-sealable base sheet and a wipe-off layer of heat-sealable continuous filaments, the article being characterized by that the wipe-off layer is bonded to the base sheet by a plurality of heat-seal lines extending to cross the wipe-off layer intermittently arranged longitudinally of the wipe-off layer.

DESCRIPTION OF THE PREFERRED EMBODIMENTS

Figure 1:
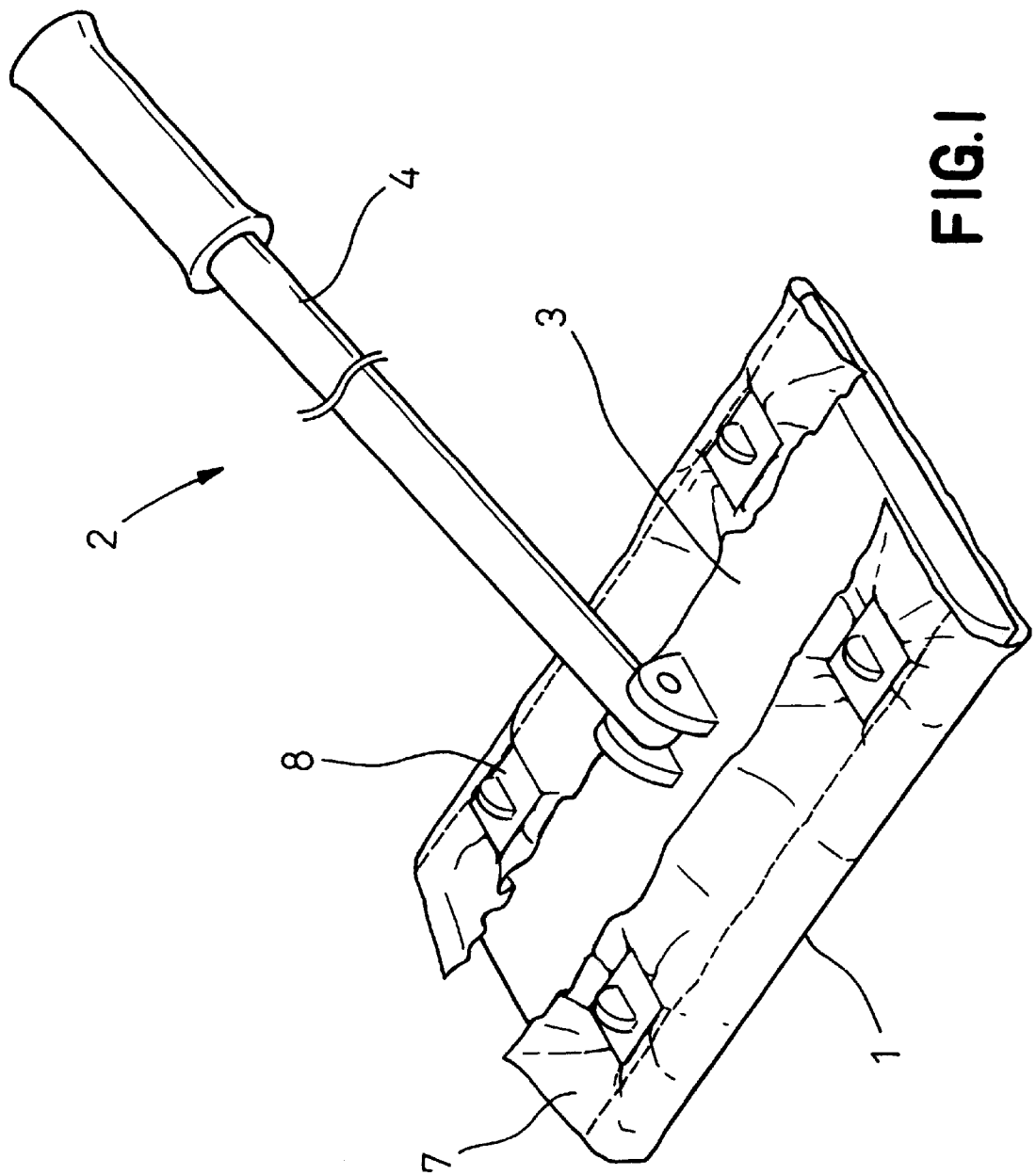
FIG. 1 is a perspective view depicting a holder fitted with a wipe-off article according to the present invention.

FIG. 1 depicts a holder 2 fitted with a disposable wipe-off article 1 in a perspective view. The holder 2 has a base plate 3 fitted with the wipe-off article 1 and a stick 4. Specifically, after the wipe-off article 1, which is wider than the base plate 3, has been put against the lower surface of the base plate 3, opposite side margins of the article 1 extending outward from transversely opposite sides of the base plate 3, are folded onto the upper surface of the base plate 3 and fixed to the upper surface of the base plate 3. In use of the wipe-off article 1 in combination with the holder 2, a house floor may be gently scrubbed by the article 1 with the stick 4 held in hand.

Figure 2:
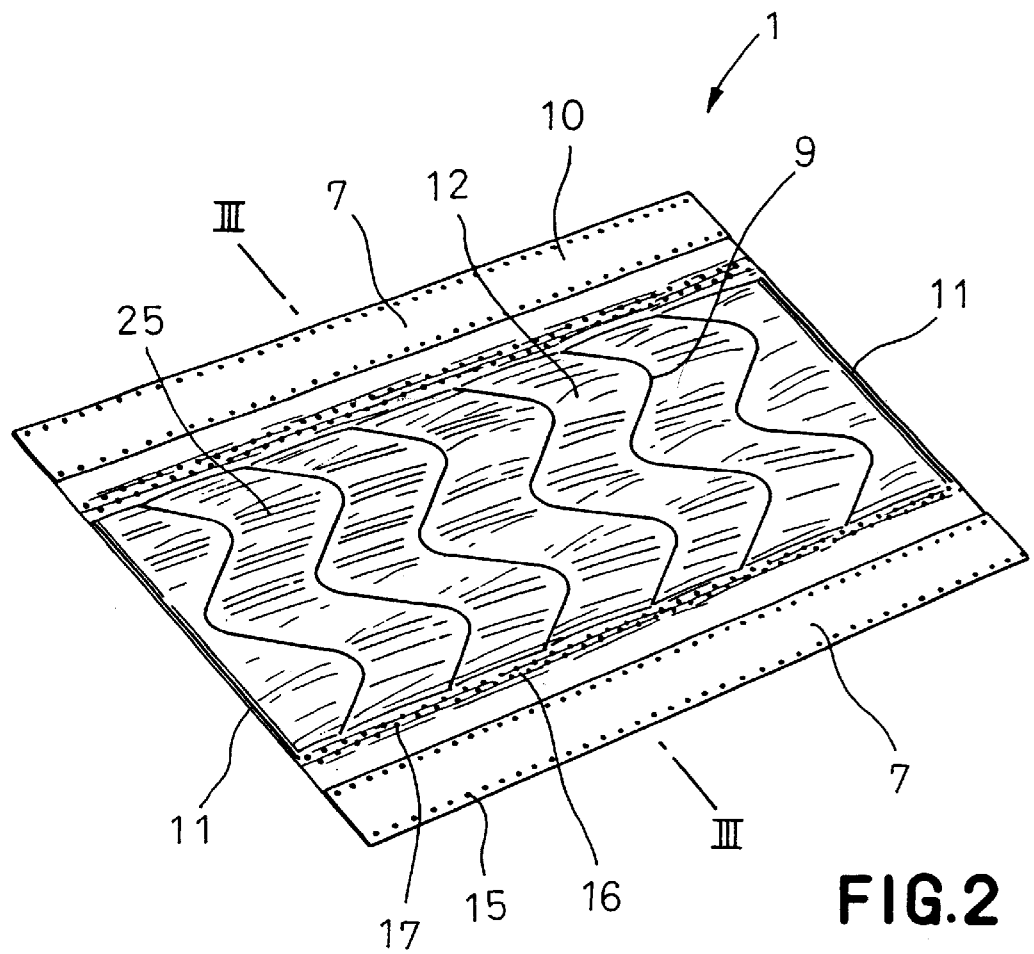
FIG. 2 is a perspective view depicting a first embodiment of the wipe-off article.
Figure 3:
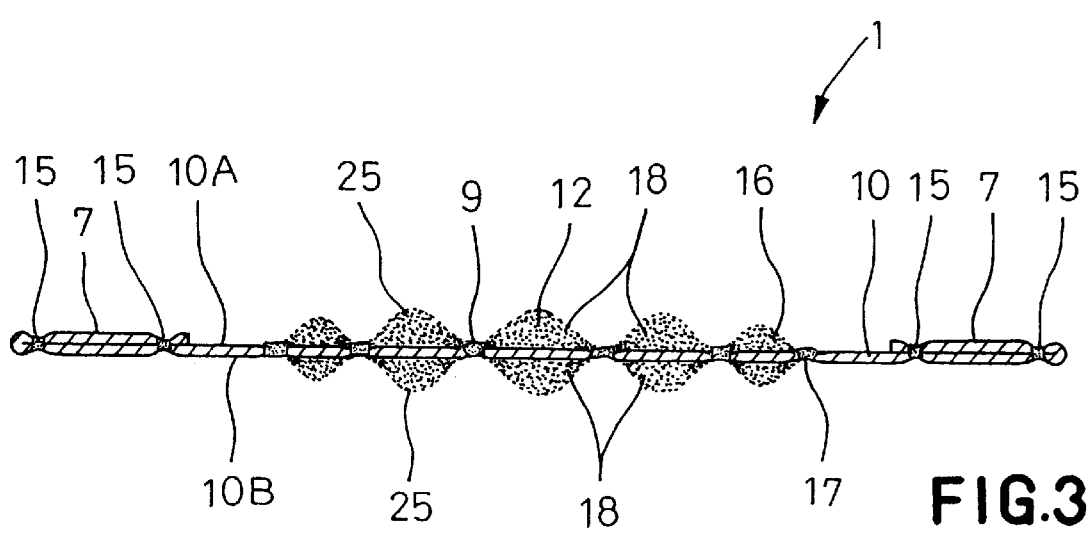
FIG. 3 is a sectional view taken along a line III—III in FIG. 2.

The article 1 perspectively depicted in FIG. 2 in an unfolded state corresponds to that depicted in FIG. 1. FIG. 3 is a sectional view taken along a line III—III in FIG. 2.

Referring to FIGS. 2 and 3, the article 1 includes a heat-sealable base sheet 10 made of a plastic film or non-woven fabric and wipe-off layers 12 formed by a heat-sealable continuous filaments 25 fixedly bonded to upper and lower surfaces 10A, 10B of the base sheet 10.

Side edges 7 of the base sheet 10 which are transversely opposite to each other as viewed in FIG. 3 are folded back to form double-layered edges which are, in turn, fixedly integrated by heat-seal spots 15 provided on desired locations. Each of these double-layered side edges 7 is not readily torn even when it is fastened by clips 8 of the holder 2.

The continuous filaments 25 of the wipe-off layers 12 are arranged substantially parallel to long sides of the article 1 and bonded to the base sheet 10 by heat-seal lines extending to cross the continuous filaments 25. To obtain such wipe-off layers 12, a tow or a bundle of the heat-sealable continuous filaments 25 is opened and expanded to an appropriate width in a web-like state. The opened tow is then continuously fed onto the upper and lower surfaces of the heat-sealable base sheet web longitudinally thereof as the opened tow and base sheet are bonded together by heating and pressing against each other along a plurality of heat-seal lines extending to cross the opened tow. Finally, the opened tow is cut together with the base sheet web together in a desired length. After cutting, the base sheet web forms the individual base sheets 10 and the opened tow forms the individual wipe-off layers 12.

The base sheet 10 and wipe-off layers 12 are bonded together along longitudinally opposite ends by heat-seal lines 11 extending orthogonally to the continuous filaments The base sheet 10 and the wipe-off layers 12 are bonded together in a region defined between these longitudinally opposite ends by intermittently arranged curved heat-seal lines 9 which cross the continuous filaments substantially in an oblique direction. Regarding the wipe-off layers 12, the continuous filaments 25 occupying upper and lower side edges 16 as viewed in FIG. 2 (left and right side edges as viewed in FIG. 3) are bonded to the base sheet 10 by heat-seal spots 17. These heat-seal spots 17 allow the continuous filaments 25 to be fixed to the base sheet 10 even if the heat-seal lines 9 do not extend to the opposite side edges 16. Along the heat-seal lines 11 of the longitudinally opposite ends, the base sheet 10 and the continuous filaments 25 are integrally heat-sealed and consequently the base sheet 10 is sufficiently thickened along these heat-seal lines 11 not only to prevent the base sheet 10 from being readily torn from these longitudinally opposite ends but also to prevent an appearance of the article 1 before and after its use from being marred due to entanglement of cut ends of the continuous filaments 25. It should be understood here that the heat-seal lines 11 along the longitudinally opposite ends as well as the heat-seal spots 17 are not essential to the article 1 and may be eliminated. On the other hand, the heat-seal lines 9 are essential ones in order to integrate the base sheet web with the opened tow. As the opened tow is heated under a pressure to form the heat-seal lines 9, regions in the proximity of the respective heat-seal lines 9 are also compressed and a density as well as a rigidity of the continuous filaments 25 become relatively high in these regions. With the wipe-off layers 12 having these regions 18, the regions 18 have rigidity higher than the remaining region and function to scratch off rather than wipe off the floor dust. Thus the wipe off effect of the article 1 is improved. When the heat-seal lines 9 are curved and cross almost all of the continuous filaments 25 as in the embodiment depicted in FIGS. 2 and 3, the regions 18 having a high rigidity can effectively wipe off the floor dust independently of the direction in which the cleaner is moved.

As the article 1 according to the embodiment depicted in FIGS. 2 and 3 has the wipe-off layers 12 on both surfaces 10A, 10B of the base sheet 10, after the one surface has been fully used, the article 1 may be reversed and the other surface may be used.

Figure 4:
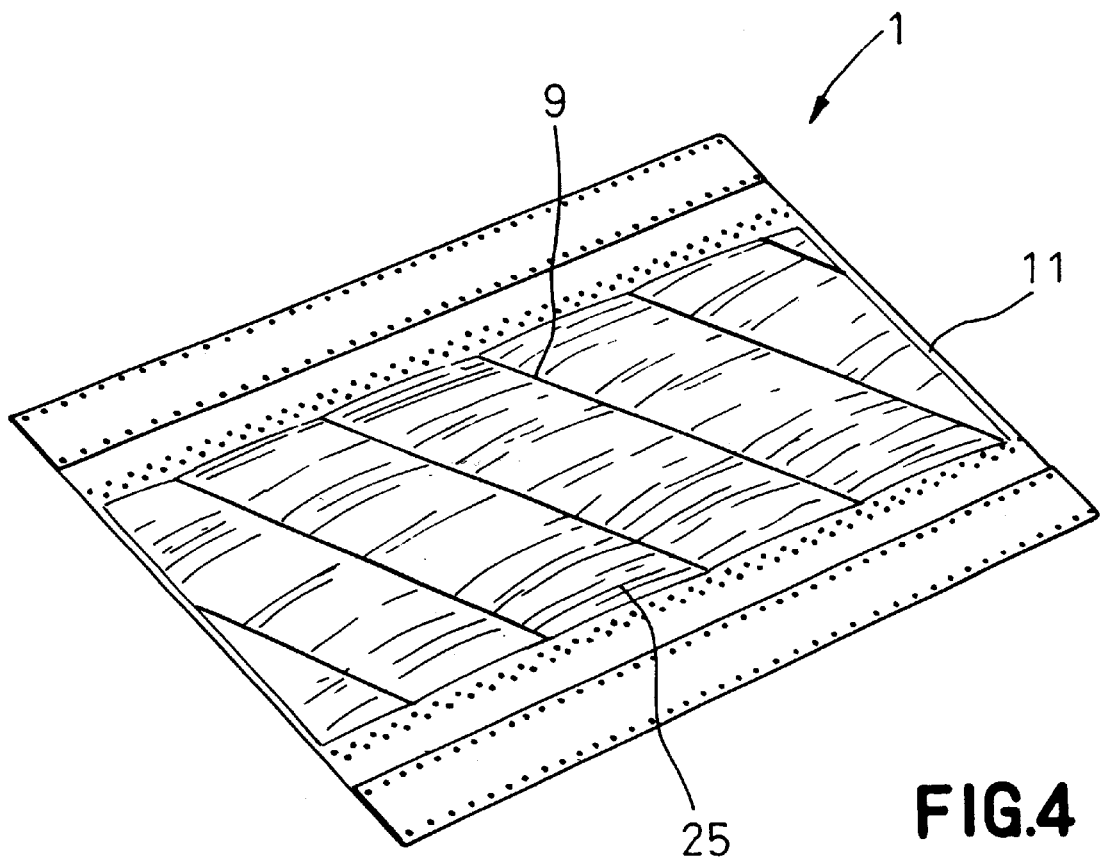
FIG. 4 is a perspective view depicting a second embodiment of the wipe-off article being different from the embodiment shown by FIG. 2.

In the article 1 depicted in FIG. 4 in a perspective view, the heat-seal lines 9 obliquely cross the continuous filaments 25 in a manner different from that depicted in FIG. 2. As depicted in FIG. 4, these heat-seal lines 9 are straight lines sloping down rightward in parallel one to another.

Figure 5:
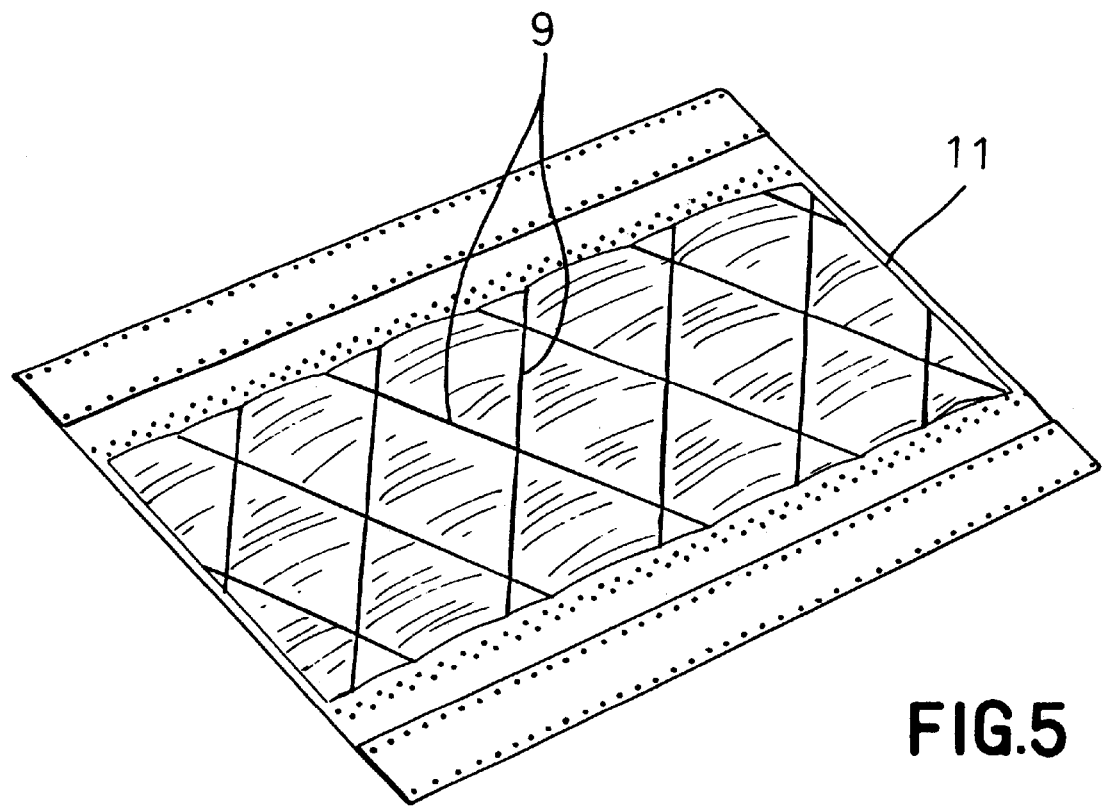
FIG. 5 is a perspective view depicting a third embodiment of the wipe-off article being also different from the embodiment shown by FIG. 2.

The article 1 depicted in FIG. 5 in a perspective view includes, in addition to the heat-seal lines 9 as depicted in FIG. 4, a plurality of the heat-lines 9 obliquely crossing the continuous filaments 25 and sloping down leftward in parallel one to another. These two groups of heat-seal lines 9 mutually cross so as to form a grid pattern. Except for the arrangement of the heat-seal lines 9, the article 1 depicted in FIG. 5 is similar to the article 1 depicted in FIG. 2.

In the wipe-off article 1 according to the invention, the base sheet 10 may be formed by a heat-sealable nonwoven fabric of synthetic resin or a plastic film and, if desired, by such nonwoven fabric mixed with non-heat-sealable fibers such as rayon or cotton of 20% by weight or less. In this case, the non-heat-sealable fibers should be unremovably embedded in the base sheet 10 and the continuous filaments 25 heat-sealed together.

The continuous filaments 25 forming the wipe-off layers 12, are preferably heat-sealable synthetic fibers of 2~20 deniers. Such filaments 25 include composite fibers or crimped fibers obtained by heat treating said composite fibers. If desired, the continuous filaments 25 may be subjected to various treatments such as surfactant immersion, antistatic finishing, electrically charging, or treatment to make the fibers hydrophilic.

With the wipe-off article of the invention, the fibers rarely fall off during operating of wiping off, since a plurality of continuous filaments are bonded to the base sheet by the heat-seal lines extending to cross the continuous filaments and intermittently arranged longitudinally of the continuous filaments. In the embodiment having the heat-seal lines obliquely crossing the continuous filaments, the high rigidity regions generated in the proximity of the heat-seal lines can effectively wipe the floor dust off independently of the direction in which the article is moved.

What is claimed is:

1. A disposable wipe-off article comprising:
   heat-sealable sheet; and
   a heat-sealable wipe-off layer including an expanded bundle of continuous filaments, the wipe-off layer being bonded to the base sheet by a plurality of heat-seal lines extending to cross the continuous filaments and intermittently arranged longitudinally of the continuous filaments.

2. A disposable wipe-off article according to claim 1, wherein the heat-seal lines comprise a plurality of curved lines substantially obliquely cross the continuous filaments and extending in parallel one to another.

3. A disposable wipe-off article according to claim 1, wherein the heat-seal lines comprise a plurality of straight lines obliquely cross the continuous filaments and extending in parallel one to another.

4. A disposable wipe-off article according to claim 3, wherein the heat-seal lines comprise a plurality of straight lines mutually cross to present a grid pattern as a whole.

5. A disposable wipe-off article according to claim 1, wherein the heat-sealable base sheet is made of a plastic film or nonwoven fabric.

6. The disposable wipe-off article according to claim 1, wherein side edges of said continuous filament wipe-off layer are bonded to the heat sealable sheet with a plurality of heat sealed spots.

* * * * *